United States Patent
Longenecker

(10) Patent No.: US 11,668,506 B2
(45) Date of Patent: Jun. 6, 2023

(54) SYSTEM AND METHOD FOR OPERATING A VARIABLE SPEED COMPRESSOR OF AN AIR CONDITIONER UNIT

(71) Applicant: Haier US Appliance Solutions, Inc., Wilmington, DE (US)

(72) Inventor: Joshua Duane Longenecker, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 0 days.

(21) Appl. No.: 17/394,749

(22) Filed: Aug. 5, 2021

(65) Prior Publication Data

US 2023/0041855 A1    Feb. 9, 2023

(51) Int. Cl.
F25B 49/02    (2006.01)

(52) U.S. Cl.
CPC ........ *F25B 49/022* (2013.01); *F25B 2500/26* (2013.01); *F25B 2600/0253* (2013.01); *F25B 2700/171* (2013.01); *F25B 2700/2104* (2013.01)

(58) Field of Classification Search
CPC .................. F25B 49/02; F25B 2500/26; F25B 2600/0253; F25B 2700/171; F25B 2700/2104
See application file for complete search history.

(56) References Cited

U.S. PATENT DOCUMENTS

| 7,513,123 | B2 | 4/2009 | Jei |
| 8,011,199 | B1* | 9/2011 | Chen ................... F24F 11/77 |
| | | | 62/157 |
| 8,793,003 | B2 | 7/2014 | Laughman |
| 9,328,946 | B2 | 5/2016 | Chen |
| 2012/0216555 | A1* | 8/2012 | Ishii ................... G05D 23/1902 |
| | | | 62/126 |

FOREIGN PATENT DOCUMENTS

| CN | 101539151 B | 6/2013 | |
| CN | 104236018 B | 5/2017 | |
| CN | 106123417 B | 9/2018 | |
| CN | 111578485 A | 8/2020 | |
| WO | WO-2014100710 A1 * | 6/2014 | ........... F04B 49/065 |

* cited by examiner

*Primary Examiner* — Jonathan Bradford
(74) *Attorney, Agent, or Firm* — Dority & Manning, P.A.

(57) ABSTRACT

An air conditioner unit includes a refrigeration loop, a variable speed compressor urging refrigerant through the refrigeration loop, a temperature sensor to detect a temperature within a room, and a controller operably coupled to the variable speed compressor. The controller is configured to initiate the compressor at a fixed speed, determine an estimated target temperature of the room, determine an actual temperature of the room, generate a target compressor speed, and initiate the compressor at the target speed.

16 Claims, 9 Drawing Sheets

SYSTEM AND METHOD FOR OPERATING A VARIABLE SPEED COMPRESSOR OF AN AIR CONDITIONER UNIT

FIELD OF THE INVENTION

The present subject matter relates generally to air conditioner units, and more particularly to methods of operating a variable speed compressor of an air conditioner unit.

BACKGROUND OF THE INVENTION

Air conditioner or conditioning units are conventionally utilized to adjust the temperature indoors, e.g., within structures such as dwellings and office buildings. Such units commonly include a closed refrigeration loop to heat or cool the indoor air. Typically, the indoor air is recirculated while being heated or cooled. A variety of sizes and configurations are available for such air conditioner units. For example, some units may have one portion installed within the indoors that is connected to another portion located outdoors, e.g., by tubing or conduit carrying refrigerant. These types of units are typically used for conditioning the air in larger spaces.

Another type of air conditioner unit, commonly referred to as single-package vertical units (SPVU) or package terminal air conditioners (PTAC), may be utilized to adjust the temperature in, for example, a single room or group of rooms of a structure. These units typically operate like split heat pump systems, except that the indoor and outdoor portions are defined by a bulkhead and all system components are housed within a single package that installed in a wall sleeve positioned within an opening of an exterior wall of a building. When a conventional PTAC is operating in a cooling or heating mode, a compressor circulates refrigerant within a sealed system, while indoor and outdoor fans urge flows of air across indoor and outdoor heat exchangers respectively.

Notably, the speed of the compressor of an air conditioner unit is often varied depending on the conditioning needs of the room. However, certain operating conditions or system characteristics may occur that result in undesirable operating regions for the compressor. For example, variable speed compressors may selectively run at a fixed speed for quick temperature change or determining a temperature set point of a room, or a variable speed for maintaining the set temperature. When control of the compressor is switched from a fixed speed to a variable speed, the sudden change in speed may generate undesirable noise to users in the room. This may be particularly true when there is a large difference between a set temperature and an actual temperature of the room. Further, beginning an operation of the air conditioner unit at varying compressor speeds may generate undesirable noise and produce undue wear on the compressor.

Accordingly, improved air conditioner units and methods of operation to reduce harmful noise would be useful. More specifically, an air conditioner unit that regulates the compressor speed between operating modes would be particularly beneficial.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, an air conditioner unit is provided. The air conditioner unit may include a refrigeration loop including an outdoor heat exchanger and an indoor heat exchanger; a variable speed compressor operably coupled to the refrigeration loop and being configured to urge a flow of refrigerant through the outdoor heat exchanger and the indoor heat exchanger; a temperature sensor configured to detect an indoor temperature of a room; and a controller operably coupled to the variable speed compressor and the temperature sensor. The controller may be configured to operate the variable speed compressor at a fixed compressor speed for a predetermined amount of time; determine a target temperature of a room after the predetermined amount of time has elapsed; obtain the indoor temperature using the temperature sensor; generate a target compressor speed based at least in part on the estimated temperature of the room, the indoor temperature, and the fixed compressor speed; and operate the variable speed compressor at the target compressor speed.

In another exemplary aspect of the present disclosure, a method of operating an air conditioner unit is provided. The air conditioner unit may include a refrigeration loop, a variable speed compressor operably coupled to the refrigeration loop and being configured to urge a flow of refrigerant through the refrigeration loop, and a temperature sensor operably coupled to the refrigeration loop. The method may include operating the variable speed compressor at a fixed compressor speed for a predetermined amount of time; determining a target temperature of a room after the predetermined amount of time has elapsed; obtaining an indoor temperature of the room using the temperature sensor; generating a target compressor speed based at least in part on the estimated temperature of the room, the indoor temperature, and the fixed compressor speed; and operating the variable speed compressor at the target compressor speed.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
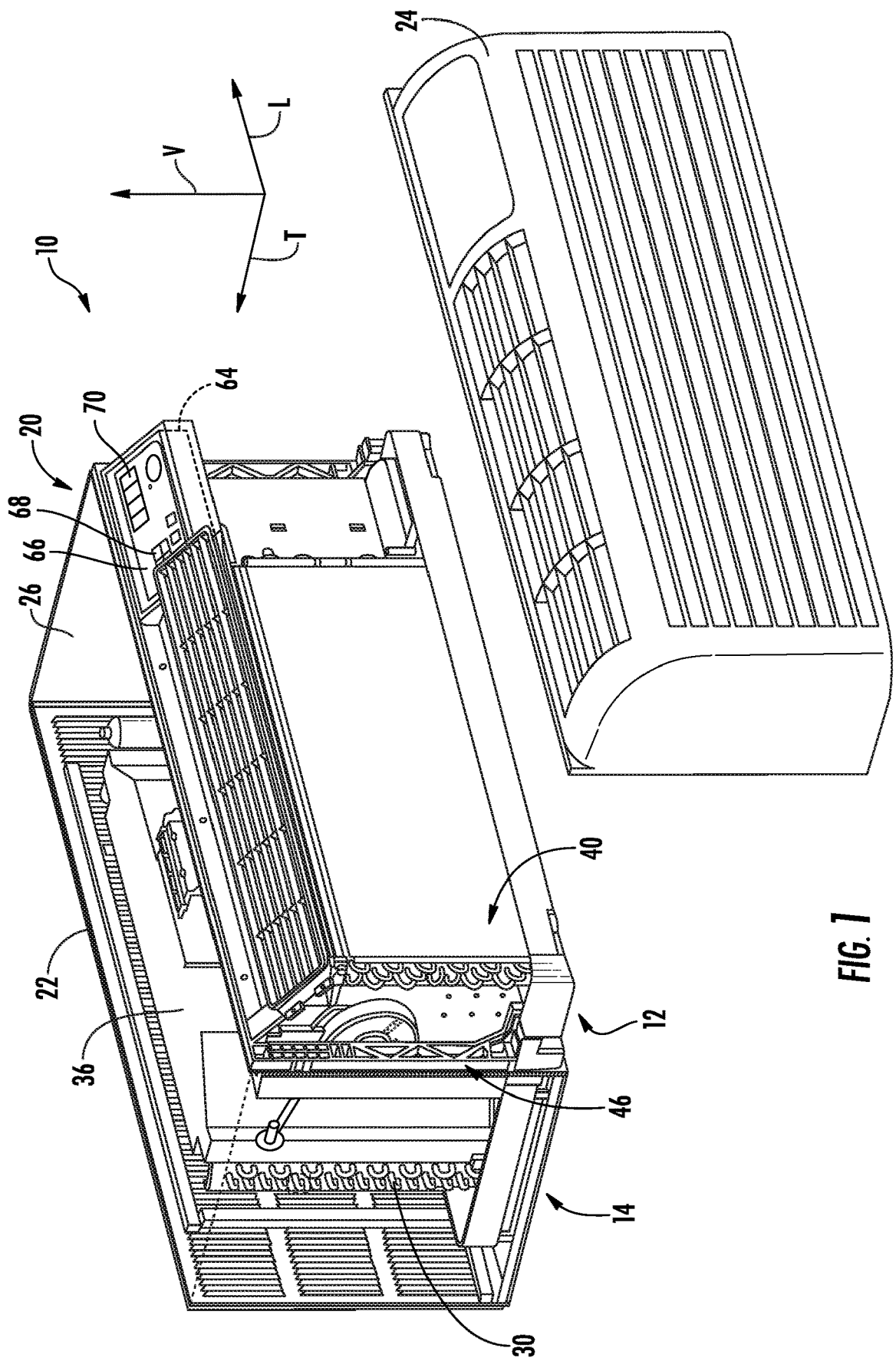
FIG. 1 provides a perspective view of an air conditioner unit, with part of an indoor portion exploded from a remainder of the air conditioner unit for illustrative purposes, in accordance with one exemplary embodiment of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
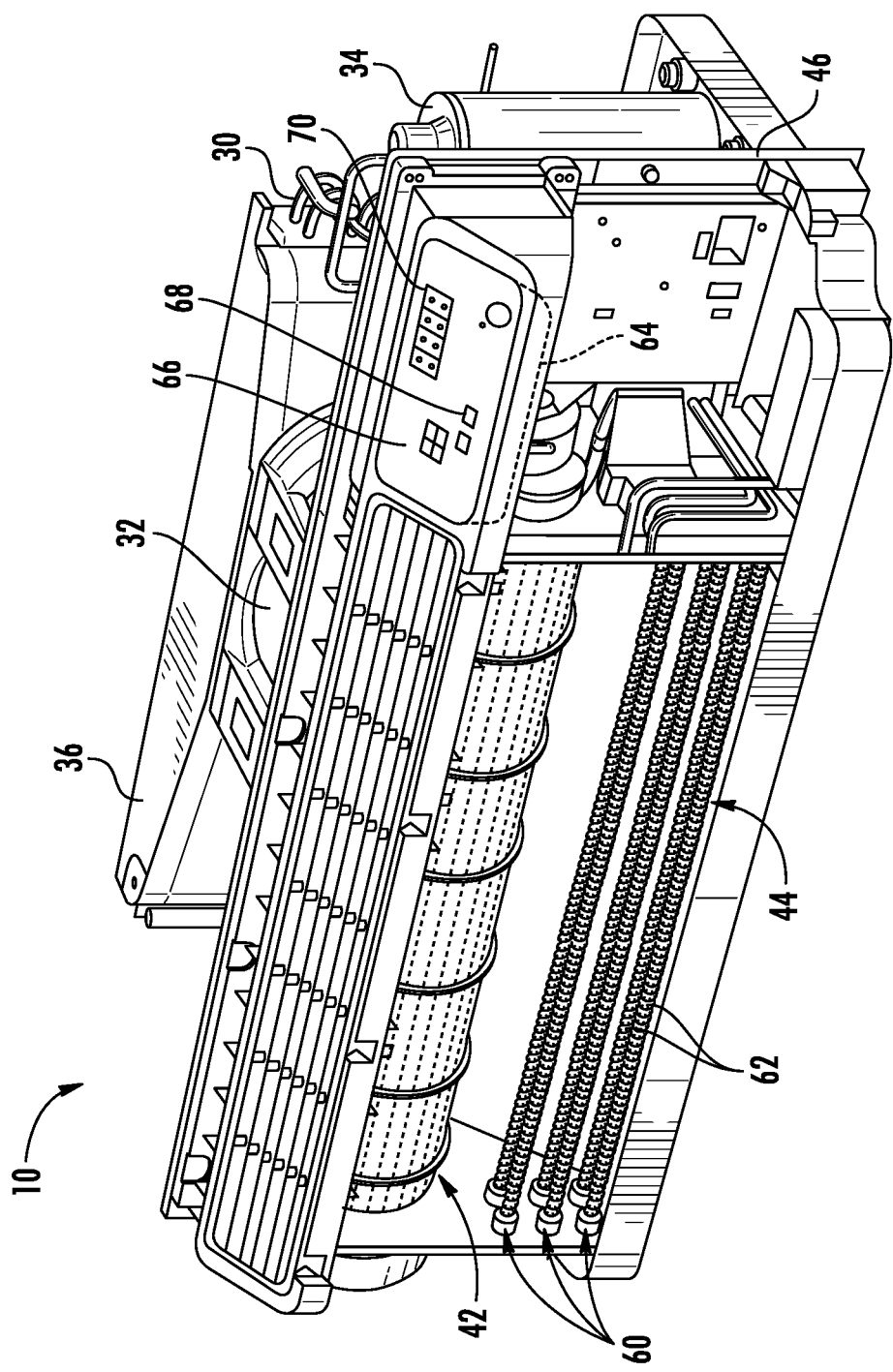
FIG. 2 is another perspective view of components of the indoor portion of the exemplary air conditioner unit of FIG. 1.

Referring now to FIGS. 1 and 2, an air conditioner unit 10 is provided. The air conditioner unit 10 is a one-unit type air conditioner, also conventionally referred to as a room air conditioner or a packaged terminal air conditioner (PTAC). The unit 10 includes an indoor portion 12 and an outdoor portion 14, and generally defines a vertical direction V, a lateral direction L, and a transverse direction T. Each direction V, L, T is perpendicular to each other, such that an orthogonal coordinate system is generally defined.

A housing 20 of the unit 10 may contain various other components of the unit 10. Housing 20 may include, for example, a rear grill 22 and a room front 24 which may be spaced apart along the transverse direction T by a wall sleeve 26. The rear grill 22 may be part of the outdoor portion 14, and the room front 24 may be part of the indoor portion 12. Components of the outdoor portion 14, such as an outdoor heat exchanger 30, an outdoor fan 32, and a compressor 34 may be housed within the wall sleeve 26. A fan shroud 36 may additionally enclose outdoor fan 32, as shown.

Indoor portion 12 may include, for example, an indoor heat exchanger 40, a blower fan or indoor fan 42, and a heating unit 44. These components may, for example, be housed behind the room front 24. Additionally, a bulkhead 46 may generally support and/or house various other components or portions thereof of the indoor portion 12, such as indoor fan 42 and the heating unit 44. Bulkhead 46 may generally separate and define the indoor portion 12 and outdoor portion 14.

Figure 3:
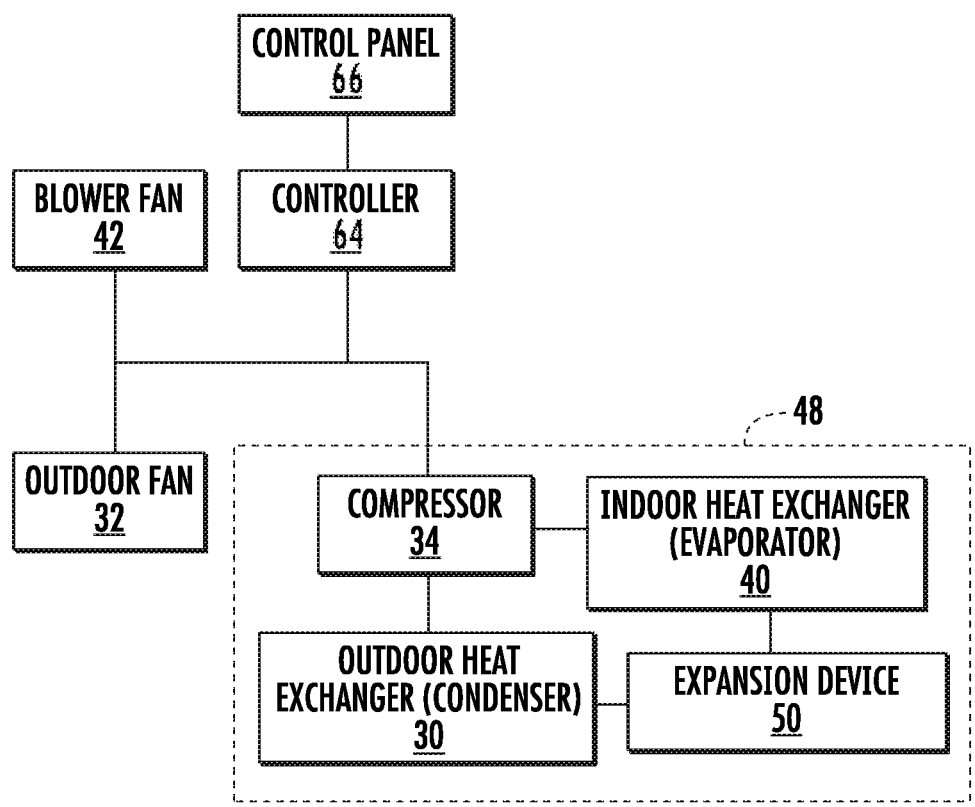
FIG. 3 is a schematic view of a refrigeration loop in accordance with one embodiment of the present disclosure.

Outdoor and indoor heat exchangers 30, 40 may be components of a sealed system or refrigeration loop 48, which is shown schematically in FIG. 3. Refrigeration loop 48 may, for example, further include compressor 34 and an expansion device 50. As illustrated, compressor 34 and expansion device 50 may be in fluid communication with outdoor heat exchanger 30 and indoor heat exchanger 40 to flow refrigerant therethrough as is generally understood. More particularly, refrigeration loop 48 may include various lines for flowing refrigerant between the various components of refrigeration loop 48, thus providing the fluid communication there between. Refrigerant may thus flow through such lines from indoor heat exchanger 40 to compressor 34, from compressor 34 to outdoor heat exchanger 30, from outdoor heat exchanger 30 to expansion device 50, and from expansion device 50 to indoor heat exchanger 40. The refrigerant may generally undergo phase changes associated with a refrigeration cycle as it flows to and through these various components, as is generally understood. Suitable refrigerants for use in refrigeration loop 48 may include pentafluoroethane, difluoromethane, or a mixture such as R410a, although it should be understood that the present disclosure is not limited to such examples and rather that any suitable refrigerant may be utilized.

As is understood in the art, refrigeration loop 48 may be alternately operated as a refrigeration assembly (and thus perform a refrigeration cycle) or a heat pump (and thus perform a heat pump cycle). As shown in FIG. 3, when refrigeration loop 48 is operating in a cooling mode and thus performing a refrigeration cycle, the indoor heat exchanger 40 acts as an evaporator and the outdoor heat exchanger 30 acts as a condenser. Alternatively, when the assembly is operating in a heating mode and thus performs a heat pump cycle, the indoor heat exchanger 40 acts as a condenser and the outdoor heat exchanger 30 acts as an evaporator. The outdoor and indoor heat exchangers 30, 40 may each include coils through which a refrigerant may flow for heat exchange purposes, as is generally understood.

According to an example embodiment, compressor 34 may be a variable speed compressor. In this regard, compressor 34 may be operated at various speeds depending on the current air conditioning needs of the room and the demand from refrigeration loop 48. For example, according to an exemplary embodiment, compressor 34 may be configured to operate at any speed between a minimum speed, e.g., 1500 revolutions per minute (RPM), to a maximum rated speed, e.g., 3500 RPM. Notably, use of variable speed compressor 34 enables efficient operation of refrigeration loop 48 (and thus air conditioner unit 10), minimizes unnecessary noise when compressor 34 does not need to operate at full speed, and ensures a comfortable environment within the room.

Specifically, according to an exemplary embodiment, compressor 34 may be an inverter compressor. In this regard, compressor 34 may include a power inverter, power electronic devices, rectifiers, or other control electronics suitable for converting an alternating current (AC) power input into a direct current (DC) power supply for the compressor. The inverter electronics may regulate the DC power output to any suitable DC voltage that corresponds to a specific operating speed of compressor. In this manner compressor 34 may be regulated to any suitable operating speed, e.g., from 0% to 100% of the full rated power and/or speed of the compressor. This may facilitate precise compressor operation at the desired operating power and speed, thus meeting system needs while maximizing efficiency and minimizing unnecessary system cycling, energy usage, and noise.

In exemplary embodiments as illustrated, expansion device 50 may be disposed in the outdoor portion 14 between the indoor heat exchanger 40 and the outdoor heat exchanger 30. According to the exemplary embodiment, expansion device 50 may be an electronic expansion valve that enables controlled expansion of refrigerant, as is known in the art. More specifically, electronic expansion device 50 may be configured to precisely control the expansion of the refrigerant to maintain, for example, a desired temperature differential of the refrigerant across the indoor heat exchanger 40. In other words, electronic expansion device 50 throttles the flow of refrigerant based on the reaction of the temperature differential across indoor heat exchanger 40 or the amount of superheat temperature differential, thereby ensuring that the refrigerant is in the gaseous state entering compressor 34. According to alternative embodiments, expansion device 50 may be a capillary tube or another suitable expansion device configured for use in a thermodynamic cycle.

According to the illustrated exemplary embodiment, outdoor fan 32 is an axial fan and indoor fan 42 is a centrifugal fan. However, it should be appreciated that according to alternative embodiments, outdoor fan 32 and indoor fan 42 may be any suitable fan type. In addition, according to an exemplary embodiment, outdoor fan 32 and indoor fan 42 are variable speed fans, e.g., similar to variable speed compressor 34. For example, outdoor fan 32 and indoor fan 42 may rotate at different rotational speeds, thereby generating different air flow rates. It may be desirable to operate fans 32, 42 at less than their maximum rated speed to ensure safe and proper operation of refrigeration loop 48 at less than its maximum rated speed, e.g., to reduce noise when full speed operation is not needed. In addition, according to alternative embodiments, fans 32, 42 may be operated to urge make-up air into the room.

According to the illustrated embodiment, indoor fan 42 may operate as an evaporator fan in refrigeration loop 48 to encourage the flow of air through indoor heat exchanger 40. Accordingly, indoor fan 42 may be positioned downstream of indoor heat exchanger 40 along the flow direction of indoor air and downstream of heating unit 44. Alternatively, indoor fan 42 may be positioned upstream of indoor heat exchanger 40 along the flow direction of indoor air and may operate to push air through indoor heat exchanger 40.

Heating unit 44 in exemplary embodiments includes one or more heater banks 60. Each heater bank 60 may be operated as desired to produce heat. In some embodiments as shown, three heater banks 60 may be utilized. Alternatively, however, any suitable number of heater banks 60 may be utilized. Each heater bank 60 may further include at least one heater coil or coil pass 62, such as in exemplary embodiments two heater coils or coil passes 62. Alternatively, other suitable heating elements may be utilized.

The operation of air conditioner unit 10 including compressor 34 (and thus refrigeration loop 48 generally) indoor fan 42, outdoor fan 32, heating unit 44, expansion device 50, and other components of refrigeration loop 48 may be controlled by a processing device such as a controller 64. Controller 64 may be in communication (via for example a suitable wired or wireless connection) to such components of the air conditioner unit 10. Controller 64 may include a memory and one or more processing devices such as microprocessors, CPUs or the like, such as general or special purpose microprocessors operable to execute programming instructions or micro-control code associated with operation of unit 10. The memory may represent random access memory such as DRAM, or read only memory such as ROM or FLASH. In one embodiment, the processor executes programming instructions stored in memory. The memory may be a separate component from the processor or may be included onboard within the processor.

Unit 10 may additionally include a control panel 66 and one or more user inputs 68, which may be included in control panel 66. The user inputs 68 may be in communication with the controller 64. A user of the unit 10 may interact with the user inputs 68 to operate the unit 10, and user commands may be transmitted between the user inputs 68 and controller 64 to facilitate operation of the unit 10 based on such user commands. A display 70 may additionally be provided in the control panel 66, and may be in communication with the controller 64. Display 70 may, for example be a touchscreen or other text-readable display screen, or alternatively may simply be a light that can be activated and deactivated as required to provide an indication of, for example, an event or setting for the unit 10.

Figure 4:
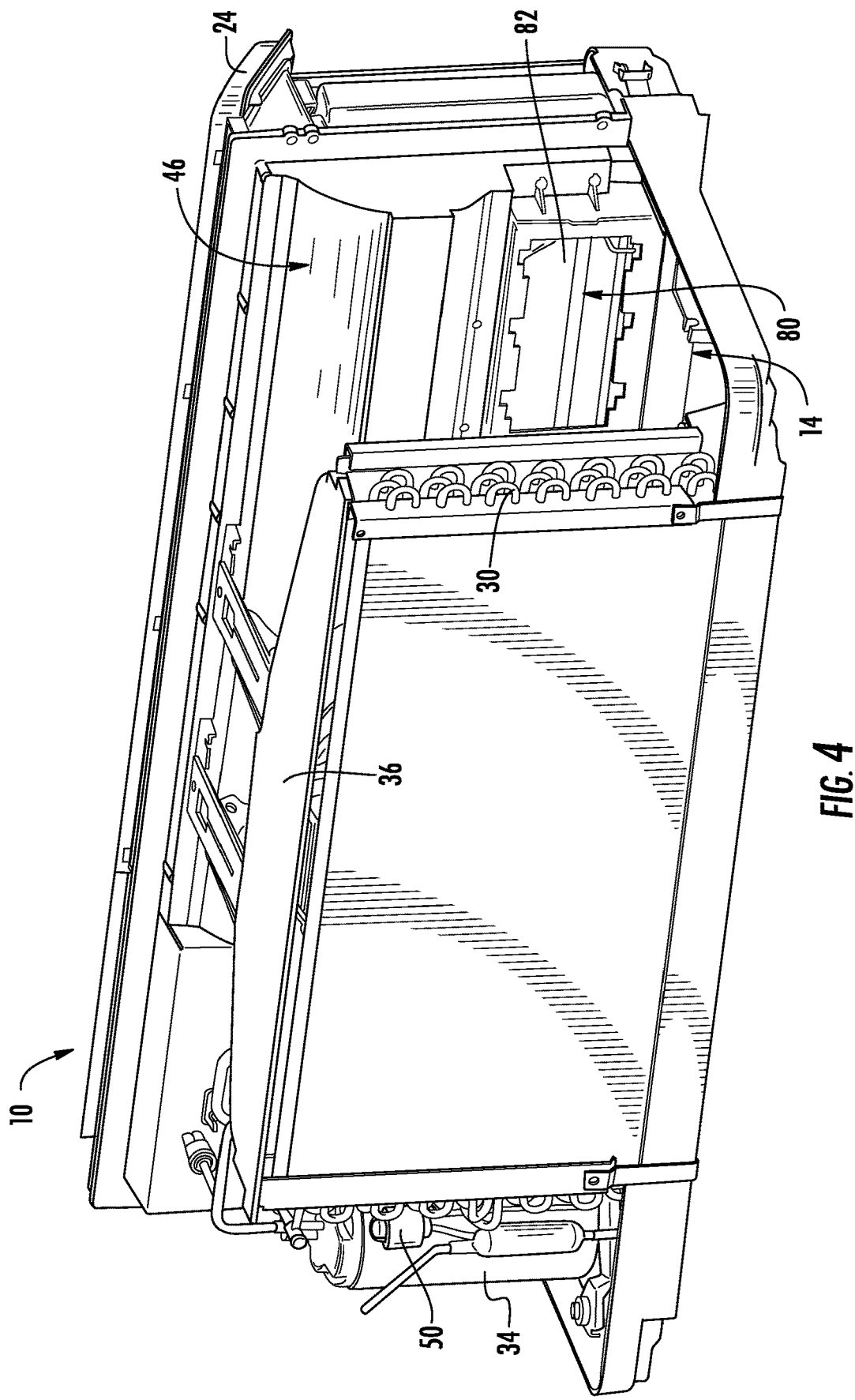
FIG. 4 is a rear perspective view of an outdoor portion of the exemplary air conditioner unit of FIG. 1, illustrating a vent aperture in a bulkhead in accordance with one embodiment of the present disclosure.

Referring briefly to FIG. 4, a vent aperture 80 may be defined in bulkhead 46 for providing fluid communication between indoor portion 12 and outdoor portion 14. Vent aperture 80 may be utilized in an installed air conditioner unit 10 to allow outdoor air to flow into the room through the indoor portion 12. In this regard, in some cases it may be desirable to allow outside air (i.e., "make-up air") to flow into the room in order, e.g., to meet government regulations, to compensate for negative pressure created within the room, etc. In this manner, according to an exemplary embodiment, make-up air may be provided into the room through vent aperture 80 when desired.

Figure 5:
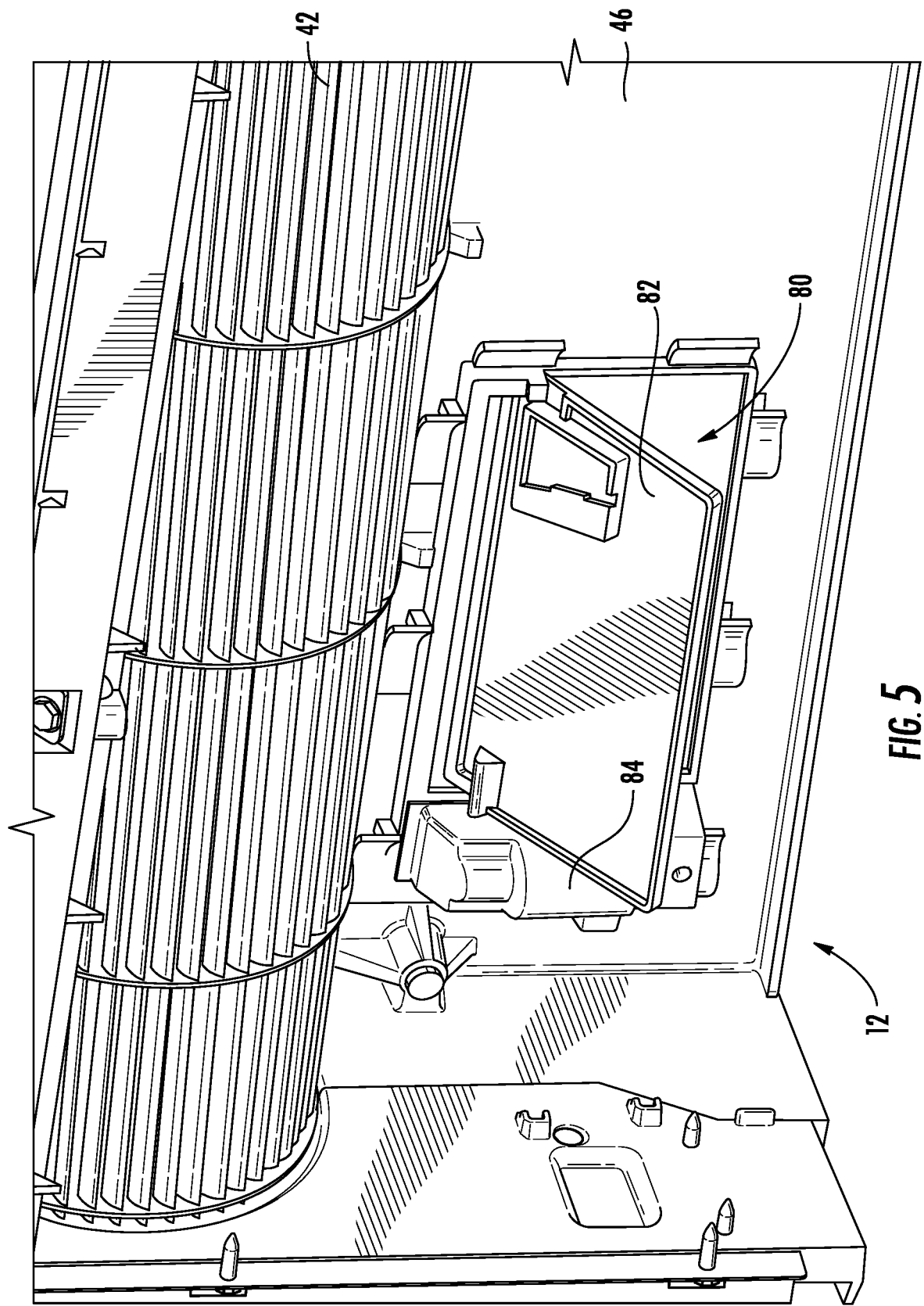
FIG. 5 is a front perspective view of the exemplary bulkhead of FIG. 4 with a vent door illustrated in the open position in accordance with one embodiment of the present disclosure.

As shown in FIG. 5, a vent door 82 may be pivotally mounted to the bulkhead 46 proximate to vent aperture 80 to open and close vent aperture 80. More specifically, as illustrated, vent door 82 is pivotally mounted to the indoor facing surface of indoor portion 12. Vent door 82 may be configured to pivot between a first, closed position where vent door 82 prevents air from flowing between outdoor portion 14 and indoor portion 12, and a second, open position where vent door 82 is in an open position (as shown in FIG. 5) and allows make-up air to flow into the room. According to the illustrated embodiment vent door 82 may be pivoted between the open and closed position by an electric motor 84 controlled by controller 64, or by any other suitable method.

In some cases, it may be desirable to treat or condition make-up air flowing through vent aperture 80 prior to blowing it into the room. For example, outdoor air which has a relatively high humidity level may require treating before passing into the room. In addition, if the outdoor air is cool, it may be desirable to heat the air before blowing it into the room. Therefore, according to an exemplary embodiment of the present subject matter, unit 10 may further include an auxiliary sealed system that is positioned over vent aperture 80 for conditioning make-up air. The auxiliary sealed system may be a miniature sealed system that acts similar to refrigeration loop 48, but conditions only the air flowing through vent aperture 80. According to alternative embodiments, such as that described herein, make-up air may be urged through vent aperture 80 without the assistance of an auxiliary sealed system. Instead, make-up air is urged through vent aperture 80 may be conditioned at least in part by refrigeration loop 48, e.g., by passing through indoor heat exchanger 40. Additionally, the make-up air may be conditioned immediately upon entrance through vent aperture 80 or sequentially after combining with the air stream induced through indoor heat exchanger 40.

Figure 6:
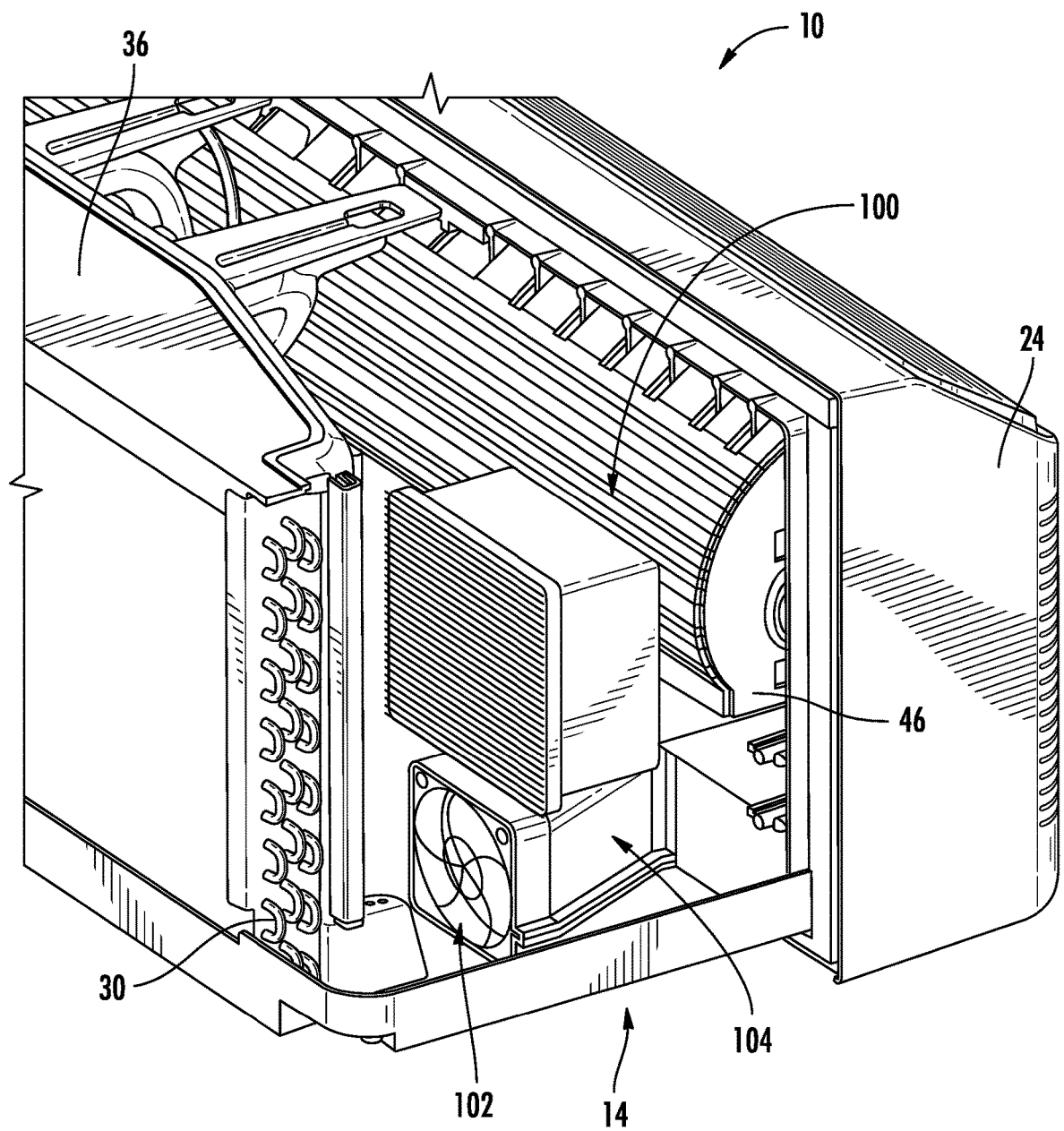
FIG. 6 is a rear perspective view of the exemplary air conditioner unit and bulkhead of FIG. 4 including a fan assembly for providing make-up air in accordance with one embodiment of the present disclosure.

Referring now to FIG. 6, a fan assembly 100 will be described according to an exemplary embodiment of the present subject matter. According to the illustrated embodiment, fan assembly 100 is generally configured for urging the flow of make-up air through vent aperture 80 and into a conditioned room without the assistance of an auxiliary sealed system. However, it should be appreciated that fan assembly 100 could be used in conjunction with a make-up air module including an auxiliary sealed system for conditioning the flow of make-up air. As illustrated, fan assembly 100 includes an auxiliary fan 102 for urging a flow of make-up air through a fan duct 104 and into indoor portion 12 through vent aperture 80.

According to the illustrated embodiment, auxiliary fan 102 is an axial fan positioned at an inlet of fan duct 104, e.g., upstream from vent aperture 80. However, it should be appreciated that any other suitable number, type, and configuration of fan or blower could be used to urge a flow of makeup air according to alternative embodiments. In addition, auxiliary fan 102 may be positioned in any other suitable location within air conditioner unit 10 and auxiliary fan 102 may be positioned at any other suitable location within or in fluid communication with fan duct 104. The embodiments described herein are only exemplary and are not intended to limit the scope present subject matter.

Figure 7:
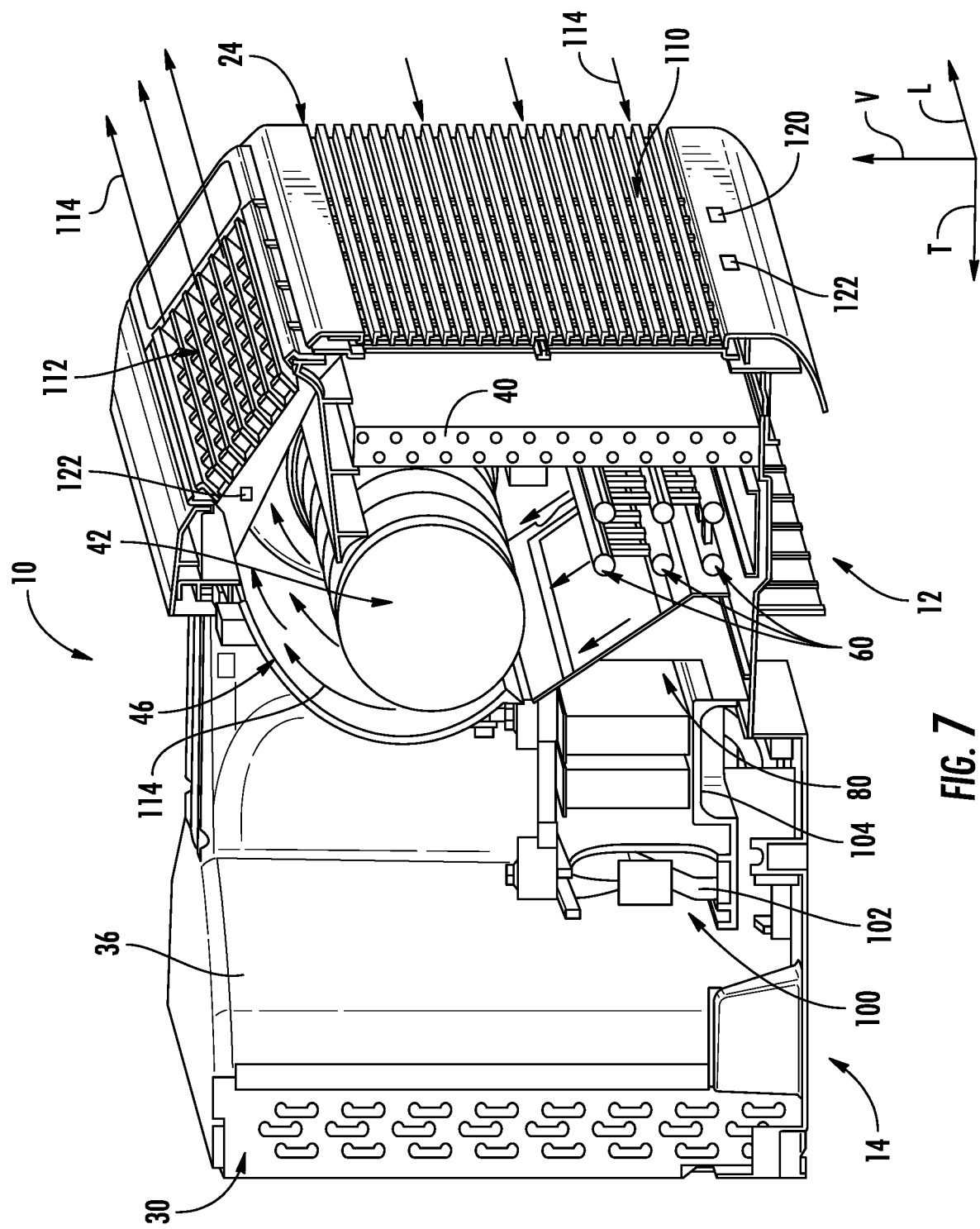
FIG. 7 is a side cross sectional view of the exemplary air conditioner unit of FIG. 1.

Referring now to FIG. 7, operation of unit 10 will be described according to an exemplary embodiment. More specifically, the operation of components within indoor portion 12 will be described during a cooling operation or cooling cycle of unit 10. To simplify discussion, the operation of auxiliary fan 102 for providing make-up air through vent aperture 80 will be omitted, e.g., as if vent door 82 were closed. Although a cooling cycle will be described, it should be further appreciated that indoor heat exchanger 40 and/or heating unit 44 be used to heat indoor air according to alternative embodiments. Moreover, although operation of unit 10 is described below for the exemplary packaged terminal air conditioner unit, it should be further appreciated that aspects the present subject matter may be used in any other suitable air conditioner unit, such as a heat pump or split unit system.

As illustrated, room front 24 of unit 10 generally defines an intake vent 110 and a discharge vent 112 for use in circulating a flow of air (indicated by arrows 114) throughout a room. In this regard, indoor fan 42 is generally configured for drawing in air 114 through intake vent 110 and urging the flow of air through indoor heat exchanger 40 before discharging the air 114 out of discharge vent 112. According to the illustrated embodiment, intake vent 110 is positioned proximate a bottom of unit 10 and discharge vent 112 is positioned proximate a top of unit 10. However, it should be appreciated that according to alternative embodiments, intake vent 110 and discharge vent 112 may have any other suitable size, shape, position, or configuration.

During a cooling cycle, refrigeration loop 48 is generally configured for urging cold refrigerant through indoor heat exchanger 40 in order to lower the temperature of the flow of air 114 before discharging it back into the room. Specifically, during a cooling operation, controller 64 may be provided with a target temperature, e.g., as set by a user for the desired room temperature. In general, components of refrigeration loop 48, outdoor fan 32, indoor fan 42, and other components of unit 10 operate to continuously cool the flow of air.

In order to facilitate operation of refrigeration loop 48 and other components of unit 10, unit 10 may include a variety of sensors for detecting conditions internal and external to the unit 10. These conditions can be fed to controller 64 which may make decisions regarding operation of unit 10 to rectify undesirable conditions or to otherwise condition the flow of air 114 into the room. For example, as best illustrated in FIG. 7, unit 10 may include an indoor temperature sensor 120 which is positioned and configured for measuring the indoor temperature within the room. In addition, unit 10 may include an indoor humidity sensor 122 which is positioned and configured for measuring the indoor humidity within the room. In this manner, unit 10 may be used to regulate the flow of air 114 into the room until the measured indoor temperature reaches the desired target temperature and/or humidity level.

However, in some embodiments, controller 64 may receive inputs from disconnected thermostats. For instance, a separate thermostat into which a user inputs a target temperature may only send an "on-off" signal to controller 64, without acknowledging a target temperature. These may be referred to as "bang-bang," "dumb," or unmodulated thermostats. According to these embodiments, controller 64 may estimate the target temperature input and desired by the user. As will be explained in more detail below, controller 64 may utilize one or more direct inputs (e.g., from indoor temperature sensor 120) to determine the estimated target temperature.

As used herein, "temperature sensor" or the equivalent is intended to refer to any suitable type of temperature measuring system or device positioned at any suitable location for measuring the desired temperature. Thus, for example, temperature sensor 120 may each be any suitable type of temperature sensor, such as a thermistor, a thermocouple, a resistance temperature detector, a semiconductor-based integrated circuit temperature sensors, etc. In addition, temperature sensor 120 may be positioned at any suitable location and may output a signal, such as a voltage, to a controller that is proportional to and/or indicative of the temperature being measured. Although exemplary positioning of temperature sensors is described herein, it should be appreciated that unit 10 may include any other suitable number, type, and position of temperature, humidity, and/or other sensors according to alternative embodiments.

As used herein, the terms "humidity sensor" or the equivalent may be intended to refer to any suitable type of humidity measuring system or device positioned at any suitable location for measuring the desired humidity. Thus, for example, humidity sensor 122 may refer to any suitable type of humidity sensor, such as capacitive digital sensors, resistive sensors, and thermal conductivity humidity sensors. In addition, humidity sensor 122 may be positioned at any suitable location and may output a signal, such as a voltage, to a controller that is proportional to and/or indicative of the humidity being measured. Although exemplary positioning of humidity sensors is described herein, it should be appreciated that unit 10 may include any other suitable number, type, and position of humidity sensors according to alternative embodiments.

Now that the construction of air conditioner unit 10 and the configuration of controller 64 according to exemplary embodiments have been presented, exemplary methods 200, 300 of operating a packaged terminal air conditioner unit will be described. Although the discussion below refers to the exemplary methods 200, 300 of operating air conditioner unit 10, one skilled in the art will appreciate that the exemplary methods 200, 300 are applicable to the operation of a variety of other air conditioning appliances. In exemplary embodiments, the various method steps as disclosed herein may be performed by controller 64 or a separate, dedicated controller.

Figure 8:
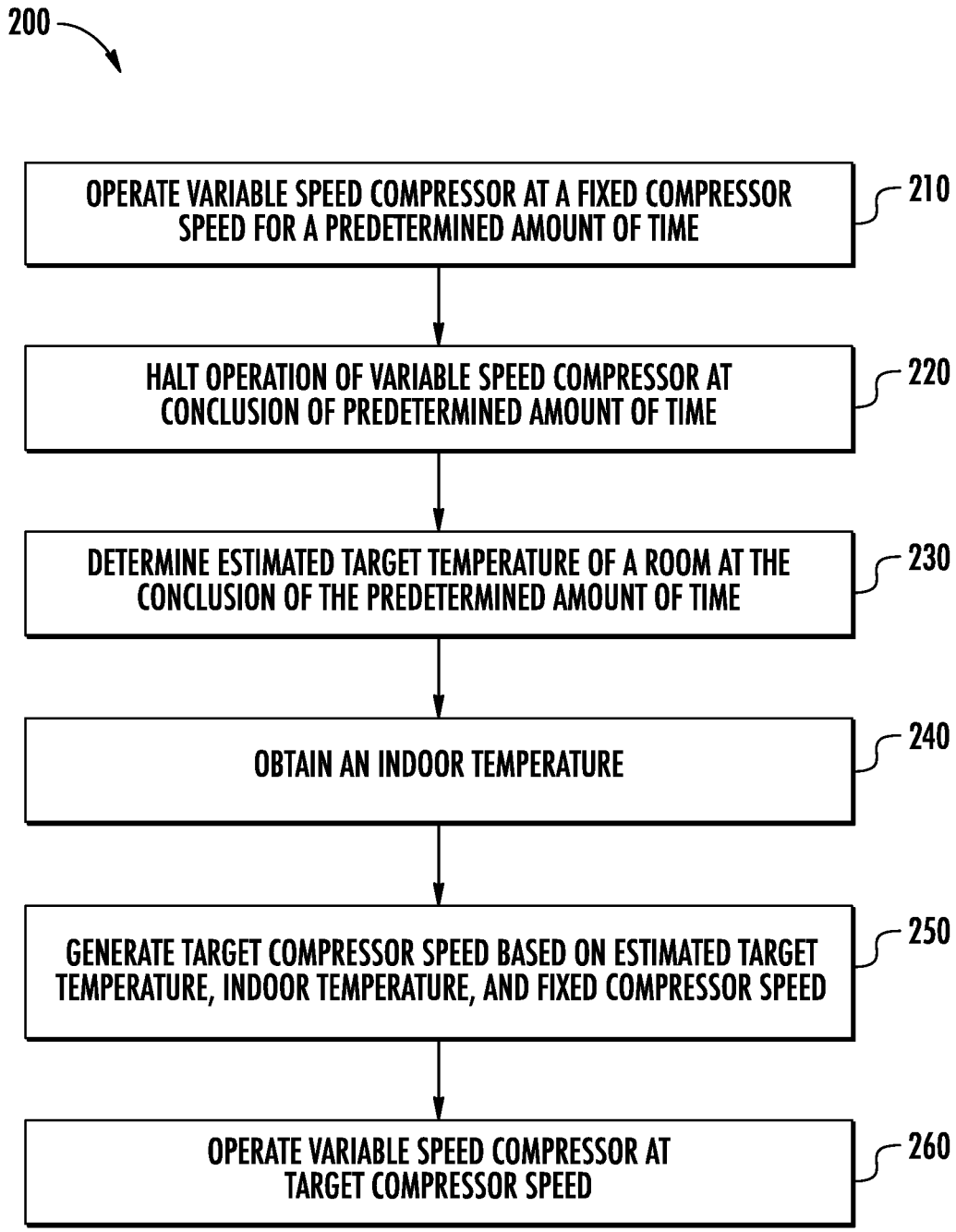
FIG. 8 illustrates a method for controlling a variable speed compressor of a packaged terminal air conditioner unit in accordance with one embodiment of the present disclosure.

Referring now to FIG. 8, method 200 may include, at step 210, operating a variable speed compressor (e.g., compressor 34) at a fixed compressor speed for a predetermined amount of time. For example, an air conditioner unit (e.g., air conditioner unit 10) may be triggered to begin performing an air conditioning process. The air conditioning process may include selectively operating the compressor, an outdoor fan (e.g., outdoor fan 32), an indoor fan (e.g., indoor fan 42), etc. to facilitate heat pump operation and the heating or cooling of indoor air. The initiation of an operating cycle may be triggered by any suitable source, in any suitable manner, and may correspond with any suitable sealed system demand, as described below according to exemplary embodiments.

As discussed above, a thermostat may send "on-off" signals to the controller to perform an operation cycle. Accordingly, upon receiving a signal from the thermostat to initiate an operation cycle, the controller may operate or drive the compressor at a predetermined speed. The predetermined speed may be a fixed speed. For example, at the commencement of an operating cycle when the compressor first begins circulating the flow of refrigerant within the refrigeration loop, the air conditioner unit may have little or no effect on the indoor temperature. Specifically, it may take a few minutes for the cooling capacity of the sealed system to take effect. Accordingly, it may be undesirable to immediately begin operating the sealed system in a closed loop manner, as this may result in undesirably high operating speeds. Thus, the compressor may be driven or operated at the fixed compressor speed for a predetermined amount of time. In some embodiments, the predetermined amount of time is between about 2 minutes and about 4 minutes.

According to some embodiments, the predetermined amount of time may be associated with a halting of the compressor. In detail, the operating cycle (e.g., the driving of the compressor) may be initiated by the thermostat and may be based at least in part on a difference between the indoor temperature (e.g., as detected by the indoor temperature sensor) and the target temperature (e.g., the temperature input by the user into the thermostat). In the case of the detached "bang-bang" thermostat, the controller (e.g., controller 64) may not initially know the target temperature as set by the user. Thus, upon first activation (e.g., receiving an "on" signal from the thermostat), the controller may drive or operate the compressor at the fixed compressor speed. The compressor may run at the fixed compressor speed either for the predetermined amount of time or until receiving an "off" signal from the thermostat. At this point, the controller may acknowledge a completion of a first operating cycle of the air conditioner unit (which will be described in further detail below).

According to another embodiment, the compressor runs for the predetermined amount of time. At the conclusion of the predetermined amount of time, method 200 may include, at step 220, halting the operation of the variable speed compressor. It should be noted that the compressor may not be stopped according to some embodiments. For instance, the controller may receive a "stop" signal (e.g., from the thermostat) and merely reduce a compressor speed instead of completely stopping the compressor. As will be discussed in further detail below, a target compressor speed may be determined at least in part by the fixed compressor speed at the conclusion of the predetermined time.

At step 230, method 200 may include determining an estimated target temperature of the room at the conclusion of the predetermined amount time. For instance, the controller may determine that either the predetermined amount of time has elapsed, or that the thermostat has sent an "off" or "stop" signal, signifying an end to the operation cycle. At this point, the controller may determine an actual indoor temperature (e.g., via the indoor temperature sensor). For example, the controller may obtain the actual indoor temperature at step 240. It should be noted that steps 230 and 240 may be reversed according to some embodiments, and the disclosure is not limited to the exact order as listed herein or in FIG. 8. By establishing the actual indoor temperature, the controller may determine that the estimated target temperature is around the actual indoor temperature as detected at the conclusion of the first operating cycle. According to some embodiments, the estimated target temperature may be within a certain predetermined percentage of the actual indoor temperature detected at the halting of the compressor. In some embodiments, the estimated target temperature may be within a predetermined number of degrees (e.g., Fahrenheit, Celsius, etc.) of the actual indoor temperature detected at the halting of the compressor. Thus, the controller may now recognize the compressor speed at the end of the predetermined time (or at the halting of the compressor), the estimated target temperature, and the actual indoor temperature.

At step 250, method 200 may include generating a target compressor speed based on the estimated target temperature, the actual indoor temperature, and the previous compressor speed (e.g., the compressor speed at the end of the predetermined time). In some embodiments, the previous compressor speed may be equal to the fixed compressor speed. For instance, in the event that the compressor runs until the predetermined amount of time has elapsed, the controller may assume that the fixed compressor speed is further required for additional cooling to be supplied to the room.

In detail, after the sealed system begins properly heating/cooling the room, it may be desirable to transition to a more active, closed-loop control system (e.g., as incorporated by the controller). In this regard, the closed-loop control system may rely on temperature and/or humidity feedback from one or more system sensors (e.g., such as indoor temperature sensor 120 and indoor humidity sensor 122). Accordingly, the predetermined amount of time may correspond to the amount of time it takes for the sealed system to begin effectively heating or cooling the room. This predetermined amount of time may be set by the user or manufacturer, may be determined empirically, or may be set in any other suitable manner. For example, according to exemplary embodiments, the predetermined amount of time may be between about 30 seconds and 10 minutes, between about 1 minute and 5 minutes, between about 2 minutes and 4 minutes, or about 3 minutes. Other predetermined amounts of time are possible and within the scope of the present subject matter.

According to some embodiments, the closed-loop feedback control algorithm may include a proportional control algorithm, a proportional-integral control algorithm (e.g., a PI controller), or a proportional-integral-derivative control algorithm (e.g., a PID controller). In general, the closed-loop feedback control algorithm may operate the variable speed compressor to minimize a difference between the detected actual indoor temperature and the estimated target temperature. In this regard, implementation of the closed-loop feedback control algorithm may include determining an error value between the actual indoor temperature and the estimated target temperature and passing or inputting the error value into the closed-loop feedback control algorithm to generate a target compressor speed as a control input that minimizes the error.

Further, as the sealed system transitions into the closed-loop (e.g., PI) control, it may be desirable to limit rapid changes in compressor speed of the variable speed compressor. For instance, in some embodiments, the compressor may run at a fixed compressor speed that is considered a low speed. A low speed may be between about 1500 revolutions per minute (RPM) and about 2500 RPM. Upon transitioning into the closed-loop control, a large delta (or difference) between the estimated target temperature and the actual indoor temperature may result in a PI controlled compressor speed that is much higher. For instance, the PI controlled compressor speed may initially be between about 4000 RPM and about 5000 RPM. In order to generate a more acceptable target compressor speed, the controller may initialize an error term in the PI equation to ensure the initial variable compressor speed is the same as the previous compressor speed.

For example, the PI equation may be:

$$\text{Variable Speed} = \text{Previous Speed} = kP * \text{proportional Error} + kI * \text{integral Error}$$

wherein kP is a proportional constant representing a constant compressor speed change, kI is an integral between the actual indoor temperature and the estimated target temperature, proportional error is a difference in the actual indoor temperature and the estimated target temperature, and integral error is a constant non-zero value. In order to properly generate the target compressor speed as the previous compressor speed, the controller may solve the equation for the integral error, such that:

$$\text{Integral Error} = \frac{\text{Previous compressor speed} - kP * \text{Error}}{kI}$$

The controller may then determine and initialize a proper integral error to ensure that the variable speed compressor is started at the same speed as the previous compressor speed upon switching to the closed-loop control. Thus, switching from the fixed compressor speed to a variable compressor speed (when transitioning to the closed-loop control) may be seamless. Accordingly, wear on the compressor may be avoided. Additionally or alternatively, transient noise from the compressor may be reduced and a customer satisfaction may be improved. Further details regarding the operation of the closed-loop feedback control algorithm are generally well known in the art and further detailed discussion will be omitted here for brevity.

Thus, at step 260, method 200 may include operating the variable speed compressor at the target speed. Upon switching over to the closed-loop (PI) control, the controller may continually analyze the conditions of the room to alter the compressor speed, ensuring minimal temperature changes within the room and operating the compressor in an economical fashion. Additionally or alternatively, the compressor may remain in the closed-loop control. For instance, the controller may monitor the inputs from the thermostat and determine an operating mode of the air conditioner unit, as will be described in more detail below. The operating mode of the air conditioner unit may be at least one of a heating mode, a cooling mode, or a dehumidifying mode. Other operation modes may be implemented, such as a combination heating/cooling mode, a combination cooling/dehumidifying mode, or a combination heating/dehumidifying mode, for example.

Figure 9:
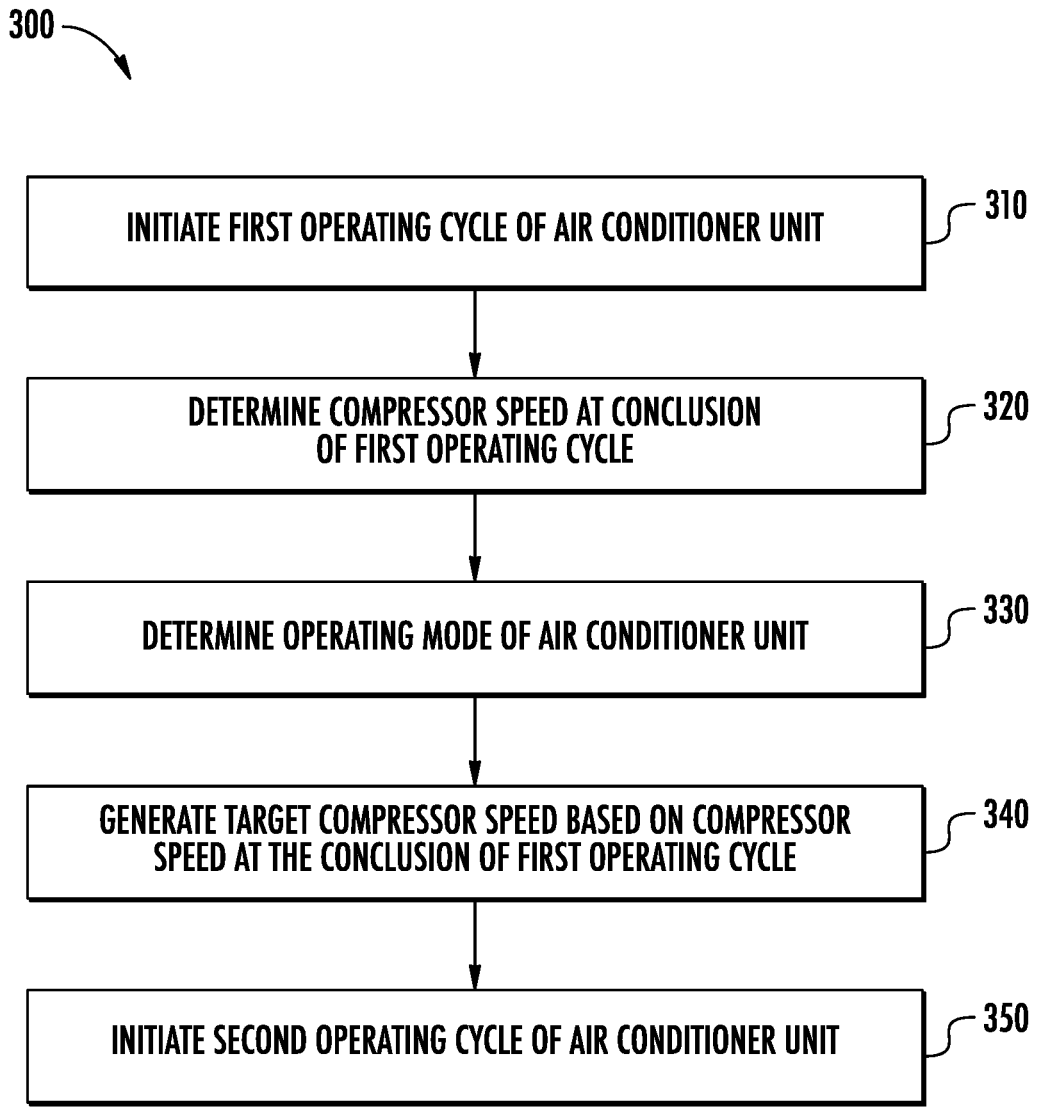
FIG. 9 illustrates a method for controlling a variable speed compressor of a packaged terminal air conditioner unit in accordance with another embodiment of the present disclosure.

Referring now to FIG. 9, method 300 may describe another method of operating an exemplary air conditioner unit. Method 300 may be similar to method 200, and as such, detailed descriptions of identical steps will be omitted for brevity. As discussed above, the air conditioner unit may run in one of several operating modes. The controller may monitor the operating mode of the air conditioner unit and control the compressor accordingly. For instance, in the case of the "bang-bang" thermostat described above, if the controller receives an input to raise a temperature, the controller may assume that the unit is running in a heating mode. Similarly, if the controller receives an input to lower a temperature, the controller may assume that the unit is running in a cooling mode. Thus, in step 310, method 300 may include initiating an operating cycle of the air conditioner unit.

In this instance, the operating cycle may include initiating the compressor at the fixed compressor speed. As described above, the fixed compressor speed may be a low speed (1500-2500 RPM) or a high speed (4000-5000 RPM). The operating cycle may include operating the compressor for the predetermined amount of time (e.g., for the full predetermined amount of time or until the controller receives an "off" or "stop" signal from the thermostat). Accordingly, a full heating or cooling operation may encompass the operating cycle.

At step 320, method 300 may include determining the compressor speed at the conclusion of the first operating cycle. According to this embodiment, the first operating cycle may be a first operating cycle according to a specific operating mode. In detail, a user may initiate a heating mode (e.g., at the start of Autumn or Winter), with the compressor first operating at the fixed compressor speed. Additionally or alternatively, the first operating cycle may be a subsequent operating cycle within the operating mode. In detail, the user may have the heating mode active for several operating cycles. At this point, the first cycle may include the compressor already operating in the closed-loop mode (e.g., at variable compressor speeds). Thus, the compressor speed of the variable speed compressor may be the fixed compressor speed or may be a speed previously determined during the closed-loop mode.

At step 330, method 300 may include determining an operating mode of the air conditioner unit. As described above, the air conditioner unit may operate in one of several operating modes. After the conclusion of the first operating cycle, the controller may determine in which mode the air conditioner unit is operating. In some embodiments, the controller stores this determination (e.g., in a memory). Subsequently, before a second operating cycle commences, the controller may compare the stored determination with the input from the thermostat (e.g., for the second operating cycle).

At step 340, method 300 may include generating a target compressor speed based on the compressor speed at the conclusion of the first operating cycle. Fundamentally, the controller may generate the target compressor speed similar to that as described above. However, according to this embodiment, the controller may then determine whether the operating mode of the second cycle is the same as the operating mode of the first cycle. For instance, if the first operating cycle was a heating cycle, the controller may determine whether the second operating cycle is a heating cycle. In the instance where the operating mode for the second operating cycle is different from the operating mode for the first cycle, method 300 may return to step 310.

In the instance where the operating mode for the second operating cycle is the same as the operating mode for the first cycle, the controller may incorporate a bias into the target compressor speed. In detail, the target speed may be equal to the compressor speed at the conclusion of the first operating cycle minus an offset bias. The offset bias may be a predetermined amount (e.g., RPM) less than the previous compressor speed (e.g., at the conclusion of the first operating cycle).

For instance, the offset bias may be between about 100 RPM and about 500 RPM, between about 200 RPM and about 400 rpm, or between about 250 RPM and about 300 RPM. In some embodiments, the bias is about 250 RPM. For example, if the previous compressor speed is determined to be 3500 RPM, the controller may apply the bias (e.g., 250 RPM) such that the target compressor speed for the second operating cycle is 3250 RPM.

In some embodiments, the controller may establish a minimum compressor speed. The minimum compressor speed may be determined as the lowest speed that allows the air conditioner unit to maintain the estimated target temperature within the room. Accordingly, in the case where the generated target compressor speed is less than the minimum compressor speed, the controller may implement the minimum compressor speed as the target compressor speed.

At step 350, method 300 may include initiating the second operating cycle of the air conditioner unit. As described above, when the operating mode for the second operating cycle is the same as the operating mode for the first operating cycle, the compressor may be initiated at the target compressor speed (e.g., the determined compressor speed at the conclusion of the first operating cycle minus the bias). At this point, the closed-loop control of the compressor may be fully incorporated.

FIGS. 8 and 9 depict steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 200 and method 300 are explained using unit 10 as an example, it should be appreciated that this method may be applied to operate any suitable air conditioner unit.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An air conditioner unit comprising:
 a refrigeration loop comprising an outdoor heat exchanger and an indoor heat exchanger;
 a variable speed compressor operably coupled to the refrigeration loop and being configured to urge a flow of refrigerant through the outdoor heat exchanger and the indoor heat exchanger;
 a temperature sensor configured to detect an indoor temperature of a room; and
 a controller operably coupled to the variable speed compressor and the temperature sensor, the controller being configured to:
  operate the variable speed compressor at a fixed compressor speed for a predetermined amount of time;
  determine a target temperature of the room after the predetermined amount of time has elapsed;
  obtain the indoor temperature using the temperature sensor;
  generate a target compressor speed based at least in part on the target temperature of the room, the indoor temperature, and the fixed compressor speed, wherein generating the target compressor speed comprises determining the compressor speed of the variable speed compressor at the conclusion of the predetermined time and generating the target compressor speed based at least in part on a closed loop feedback control algorithm in response to determining the compressor speed of the variable speed compressor at the conclusion of the predetermined time; and
  operate the variable speed compressor at the target compressor speed, wherein the closed loop feedback control algorithm comprises a proportional-integral control algorithm including a proportional error term and an integral error term, and wherein the integral error term is initialized such that the target compressor speed is equal to the speed of the compressor at the conclusion of the predetermined time.

2. The air conditioner unit of claim 1, wherein the target temperature of the room is an estimated target temperature determined in part from the obtained indoor temperature of the room after the predetermined amount of time has elapsed, and wherein the controller is further configured to:
 initiate the operation of the variable speed compressor at the target compressor speed in response to determining the target temperature of the room.

3. The air conditioner unit of claim 1, wherein the controller is further configured to:
 initiate a first operating cycle of the air conditioner unit;
 determine a compressor speed of the variable speed compressor at a conclusion of the first operating cycle; and
 initiate a second operating cycle of the air conditioner unit, wherein each of the first and second operating cycles comprises operating the variable speed compressor for the predetermined amount of time and halting the variable speed compressor after the predetermined amount of time.

4. The air conditioner unit of claim 3, wherein the controller is further configured to:
 determine that an operating mode of the air conditioner unit at the initiation of the second operating cycle is the same as the operating mode at a conclusion of the first operating cycle; and
 generate the target compressor speed as the compressor speed at the conclusion of the predetermined time minus an offset bias.

5. The air conditioner unit of claim 4, wherein the offset bias is between about 100 revolutions per minute and about 400 revolutions per minute.

6. The air conditioner unit of claim 4, wherein the offset bias is about 250 revolutions per minute.

7. The air conditioner unit of claim 4, wherein the controller is further configured to:
establish a minimum compressor speed;
determine that the generated target compressor speed is less than the minimum compressor speed; and
operate the variable speed compressor at the minimum compressor speed.

8. The air conditioner unit of claim 7, wherein the controller is further configured to:
determine that the operating mode of the air conditioner unit at the initiation of the second operating cycle is different from the operating mode at the conclusion of the first operating cycle; and
initiate the variable speed compressor at the fixed compressor speed.

9. The air conditioner unit of claim 8, wherein the operating mode is one of a heating mode, a cooling mode, or a dehumidify mode.

10. A method of operating an air conditioner unit, the air conditioner unit comprising a refrigeration loop, a variable speed compressor operably coupled to the refrigeration loop and being configured to urge a flow of refrigerant through the refrigeration loop, and a temperature sensor operably coupled to the refrigeration loop, the method comprising:
operating the variable speed compressor at a fixed compressor speed for a predetermined amount of time;
determining a target temperature of a room after the predetermined amount of time has elapsed;
obtaining an indoor temperature of the room using the temperature sensor;
generating a target compressor speed based at least in part on the target temperature of the room, the indoor temperature, and the fixed compressor speed, wherein generating the target compressor speed comprises determining the compressor speed of the variable speed compressor at the conclusion of the predetermined time and generating the target compressor speed based at least in part on a closed loop feedback control algorithm in response to determining the compressor speed of the variable speed compressor at the conclusion of the predetermined time; and
operating the variable speed compressor at the target compressor speed, wherein the closed loop feedback control algorithm comprises a proportional-integral control algorithm including a proportional error term and an integral error term, and wherein the integral error term is initialized such that the target compressor speed is equal to the speed of the compressor at the conclusion of the predetermined time.

11. The method of claim 10, further comprising:
halting the operation of the variable speed compressor at the conclusion of the predetermined amount of time; and
initiating the operation of the variable speed compressor at the target compressor speed in response to determining the target temperature of the room.

12. The method of claim 10, further comprising:
initiating a first operating cycle of the air conditioner unit;
determining a compressor speed of the variable speed compressor at a conclusion of the first operating cycle; and
initiating a second operating cycle of the air conditioner unit, wherein each of the first and second operating cycles comprises driving the variable speed compressor for the predetermined amount of time and halting the variable speed compressor after the predetermined amount of time.

13. The method of claim 12, further comprising:
determining that an operating mode of the air conditioner unit at the initiation of the second operating cycle is the same as the operating mode at a conclusion of the first operating cycle; and
generating the target compressor speed as the fixed compressor speed at the conclusion of the predetermined time minus an offset bias.

14. The method of claim 13, wherein the offset bias is between about 100 revolutions per minute and about 400 revolutions per minute.

15. The method of claim 13, further comprising:
establishing a minimum compressor speed;
determining that the generated target compressor speed is less than the minimum compressor speed; and
initiating the variable speed compressor at the minimum compressor speed.

16. The method of claim 12, further comprising:
determining that an operating mode of the air conditioner unit at the initiation of the second operating cycle is different from the operating mode at a conclusion of the first operating cycle; and
initiating the variable speed compressor at the fixed compressor speed.

\* \* \* \* \*